March 17, 1925.  1,530,400

G. PAGANO

COMBINATION FENDER AND BRAKE APPARATUS

Filed Oct. 9, 1922

Gaetano Pagano, INVENTOR.

BY Victor J. Evans, ATTORNEY.

WITNESS: J. B. White

Patented Mar. 17, 1925.

1,530,400

UNITED STATES PATENT OFFICE.

GAETANO PAGANO, OF BROOKLYN, NEW YORK.

COMBINATION FENDER AND BRAKE APPARATUS.

Application filed October 9, 1922. Serial No. 593,316.

*To all whom it may concern:*

Be it known that I, GAETANO PAGANO, a citizen of the United States, residing at Brooklyn, in the county of Kings and State of New York, have invented new and useful Improvements in Combination Fender and Brake Apparatus, of which the following is a specification.

This invention relates to combination fender and brake apparatus for vehicles.

Some of the objects of the present invention are: To equip a vehicle with a fender capable of being raised and lowered and arranged in advance of the front road wheels of the vehicle, brake devices juxtaposed with respect to each rear road wheel of the vehicle, and means for effecting the simultaneous lowering of the fender and the operation of the brake devices; to equip a vehicle with a combined fender and road wheel guard which is capable of being raised and lowered and which is supported normally in a raised position, and which when lowered prevents the road wheels from encountering a person struck by the front end of the vehicle; to equip a vehicle with brake devices each of which includes a road engaging brake shoe releasable to automatically spring into engagement with the road; and with these and other objects in view, the invention resides in the particular provision, relative disposition and operation of the parts hereinafter fully described, and illustrated in the accompanying drawing, in which—

Figure 1:
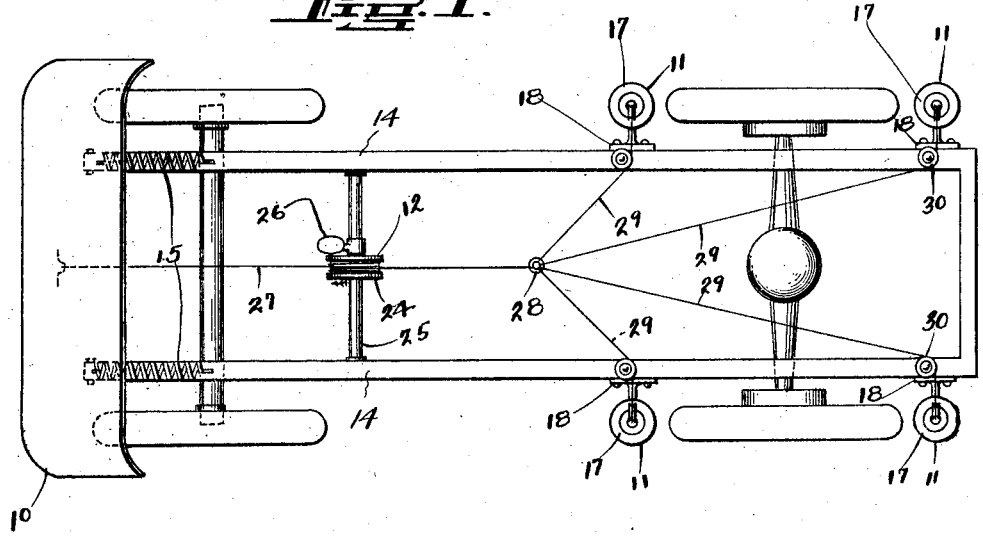
Figure 1 is a plan view of the chassis of a vehicle with the combination of elements of the present invention applied thereto.
Figure 2:
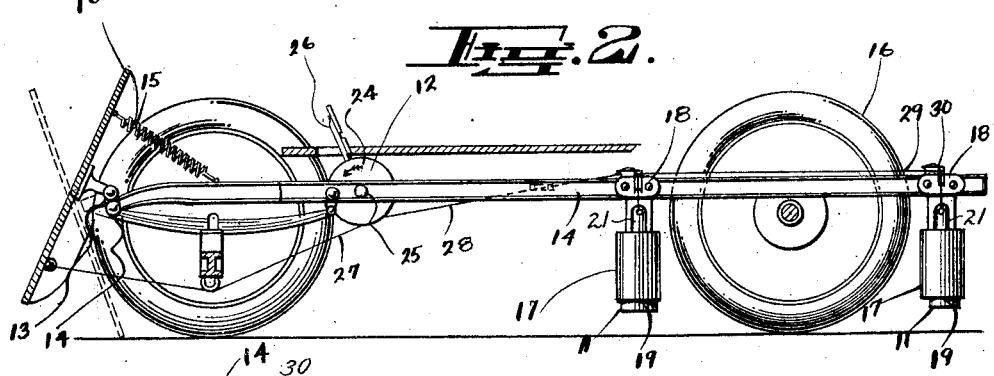
Figure 2 is a central longitudinal sectional view.
Figure 3:
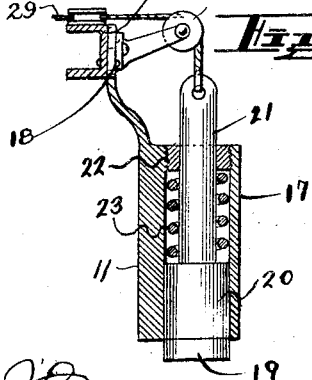
Figure 3 is a detail sectional view taken through one of the brake devices.

Referring now more particularly to the several views of the drawing, it will be apparent that, the apparatus of the present invention generally comprises a fender 10, brake devices 11, and operating means 12 including flexible connections. The fender 10 is supported by brackets 13 for pivotal movement, and the brackets are attached respectively to the longitudinals 14 of the chassis. Springs 15 are employed for yieldingly holding the fender 10 in elevated position. Each spring has one end thereof connected to the fender and the opposite end thereof is connected to a part of the chassis. The combined strength of the springs 15 is sufficient to overcome the weight of the fender and to hold the same properly supported in a raised position. Two brake devices 11 are employed in conjunction with each rear road wheel 16 of the vehicle; one being arranged at each side of the axis of the wheel in proximity to the tire thereof. Each device 11 comprises a barrel 17 having attaching means 18, and a spring actuated brake shoe 19. Each barrel 17 is attached to a part of the chassis of the vehicle as shown most clearly in Figure 3 of the drawing in which it is attached to the longitudinal 14. The shoe 19 of each device 11 is arranged for movement into and out of engagement with the road surface. This is accomplished by arranging the same on the end of a plunger 20 movable in the barrel 17. The plunger has member 21. A plug 22 is arranged in one end of the barrel 17 and a spring 23 is arranged between the plug 22 and the plunger 20.

The operating means 12 in the present instance comprises a drum 24 mounted for rotation on a shaft 25 supported by the longitudinals 14. A foot pedal 26 is connected to the shaft 25 and has the treadle portion thereof disposed above the foot board of the vehicle, and a flexible connection 27 is provided between the drum and the fender 10. Flexible connection 28 is provided between the drum and the members 21 of the brake devices 11 by virtue of leads 29 forming parts of the connection 28. The leads 29 are passed over properly arranged pulleys 30.

From the foregoing it will be manifest that by pushing forwardly on the pedal 26, the drum will be caused to turn with the result that connection 27 will be wound on the drum and the fender 10 will be lowered, and that the connection 28 will be paid out from the drum 24 with the result that the springs 23 will operate to thrust the shoes 19 in to contact with the road surface to set up a braking action. It should be further manifest that it is possible to simultaneously move the fender to a position in which the fallen individual will be prevented from coming into contact with the front road wheel of the vehicle. By virtue of the operation of the brake devices 11, the vehicle will be stopped almost instantly and by releasing pressure on the foot pedal 26 the springs 15 will act to return the fender to a normally raised position with the result that the drum will be caused to turn and the connection 28 wound so as to cause the elevation of the brake shoes 19. It will also be manifest that the arrangement of the fender with respect to the front road wheels is such that by applying sufficient pressure on the pedal 26 the fender may be brought into contact with the tires of said front road wheels to act as a brake.

What is claimed is:

1. For a vehicle having a chassis and road wheels, a fender capable of being raised and lowered and arranged in advance of the front road wheels, means for normally holding the fender raised, brake devices disposed adjacent the rear wheels and supported by the chassis and capable of having portions thereof moved into contact with the road surface, and means for lowering said fender to cause the same to contact with the front wheels and for allowing said brake devices to become active.

2. A vehicle embodying a fender capable of being raised and lowered and arranged in advance of the front road wheels of the vehicle, brake devices juxtaposed with respect to each rear road wheel of the vehicle, means for supporting the fender normally in a raised position, and means for effecting the simultaneous lowering of the fender and the operation of the brake devices, to cause said fender to be moved into contact with the front wheels and in close proximity to the road surface.

3. A vehicle embodying a fender pivotally mounted to the chassis frame in advance of the front wheels of the vehicle, springs for normally holding said fender in a raised position, brake devices supported by the chassis frame on opposite sides of the axis of the rear road wheels, each brake device including a spring actuated shoe, a foot actuated drum rotatably mounted in the chassis frame, flexible connections respectively between the fender and drum and between each shoe and drum, whereby actuation of said drum in one direction will cause the movement of said fender to a lowered position by the winding of the flexible connection to the fender about said drum, and the paying out of the flexible connection leading from said drum to permit the spring actuating shoes to contact with the road surface for setting up a braking action therewith.

In testimony whereof I have affixed my signature.

GAETANO PAGANO.